(12) United States Patent
Naito et al.

(10) Patent No.: US 8,952,581 B2
(45) Date of Patent: Feb. 10, 2015

(54) ELECTRIC TOOLS

(75) Inventors: Akira Naito, Anjo (JP); Hidenori Nagasaka, Anjo (JP); Ryunosuke Kumagai, Anjo (JP)

(73) Assignee: Makita Corporation, Anjo-Shi (JP)

( * ) Notice: Subject to any disclaimer, the term of this patent is extended or adjusted under 35 U.S.C. 154(b) by 290 days.

(21) Appl. No.: 13/563,005

(22) Filed: Jul. 31, 2012

(65) Prior Publication Data

US 2013/0033134 A1 Feb. 7, 2013

(30) Foreign Application Priority Data

Aug. 2, 2011 (JP) ................................. 2011-169009

(51) Int. Cl.
*H02K 7/14* (2006.01)
(52) U.S. Cl.
USPC .............................................. 310/50; 310/52

(58) Field of Classification Search
CPC ......... H02K 7/145; H02K 5/148; H02K 9/06; H01H 9/063
USPC .............. 310/50, 52, 54, 58, 64, 214, 215, 71
See application file for complete search history.

(56) References Cited

U.S. PATENT DOCUMENTS

| | | | | |
|---|---|---|---|---|
| 6,894,409 B2 * | 5/2005 | Bostwick et al. | ............... | 310/58 |
| 8,247,935 B2 * | 8/2012 | Onozawa et al. | .......... | 310/68 B |
| 2012/0080963 A1 * | 4/2012 | Yoshikawa | ...................... | 310/50 |

FOREIGN PATENT DOCUMENTS

| | | | | |
|---|---|---|---|---|
| JP | A-2008-290218 | 12/2008 | | |
| JP | 2010-280033 | * 6/2009 | ............... | B25F 5/02 |

* cited by examiner

*Primary Examiner* — Hanh Nguyen
(74) *Attorney, Agent, or Firm* — Oliff PLC

(57) ABSTRACT

An electric tool may include a motor housing and a motor disposed within the motor housing. The motor has a stator fixed in position relative to the motor housing and a rotor rotatable about a motor axis. Cooling air can flow within the motor housing across the motor in a direction substantially parallel to the motor axis. A baffle may be disposed within the motor housing for regulating the flow of cooling air across the motor. At least a part of the baffle may be positioned within a range of a length of the stator with respect to the axial direction of the motor axis.

19 Claims, 10 Drawing Sheets

ELECTRIC TOOLS

This application claims priority to Japanese patent application serial number 2011469009, the contents of which are incorporated herein by reference.

BACKGROUND OF THE INVENTION

1. Field of the Invention

Embodiments of the present invention relate to electric tools, and in particular to electric tools having a motor housing and a motor received within the motor housing.

2. Description of the Related Art

FIGS. 11 and 12 show a part of a known electric tool having a motor 101 as a power source. As shown in FIG. 11, the motor 101 includes a stator 102 disposed on a radially outer side and fixed within a motor housing 100, and a rotor 103 disposed on a radially inner side within the motor housing 100 and rotatable relative to the stator 102. As shown in FIG. 12, a space defined between the stator 102 and the rotor 103 within the motor housing 100 serves a part of a flow path of cooling air for cooling the motor 101 and extends parallel to a motor axis. A rotary shaft 104, a fan 105 for producing a flow of cooling air, etc., may be assembled with the motor 101 as a motor assembly that is received within the motor housing 100. The motor housing 100 is split into housing halves along a plane including the motor axis. A baffle 106 for regulating the flow of cooling air and ribs for performing various functions may be formed integrally with the inner wall of the motor housing 100. The baffle 106 may serve to regulate the flow of cooling air such that the flow area through the baffle 106 is restricted to the inside of the stator 102. Therefore, a stator coil 107 of the stator 102 that may generate heat during rotation of the motor 101 may be efficiently cooled. This type of known electric tool is disclosed, for example, in Japanese Laid-Open Patent Publication No 2008-290218.

However, in the case of the known electric tool, the motor assembly including the motor 101, etc. is mounted within one of the housing halves of the motor housing 100, which has the baffle 106 integrally molded therewith, from a lateral side with respect to the axial direction. Thereafter, the other of the housing halves is joined to the one of the housing halves to cover the motor assembly, so that the motor assembly may be received within the motor housing 100. For this reason, it is necessary to ensure a space between the baffle 106 and one end of the stator 102 with respect to the axial direction for enabling this mounting operation. In order to set the position of the baffle 106 to be closer to the motor 101, it is necessary to configure the baffle 106 such that the baffle 106 does not interfere with the motor 101 during the mounting operation from the lateral side. In such a case, it may be possible that the function of the baffle 106 for restricting the flow area to the inside of the stator 102 may be degraded, leading to low efficiency of cooling the coil 107. In addition, the baffle 106 is necessary to have a thickness that is enough to enable molding of the baffle 106.

A necessary space for the mounting operation of the motor assembly and a necessary thickness of the baffle may hinder the minimization of the axial length of the entire electric tool.

Therefore, there has been a need in the art for minimizing an axial length of an electric tool without causing degradation in function of a baffle.

SUMMARY OF THE INVENTION

In one aspect according to the present teachings, an electric tool includes a motor housing and a motor disposed within the motor housing. The motor has a stator fixed in position relative to the motor housing and a rotor rotatable about a motor axis. Cooling air can flow within the motor housing across the motor in a direction substantially parallel to the motor axis. A baffle may be disposed within the motor housing for regulating the flow of cooling air across the motor. At least a part of the width of the baffle may be positioned within a range of a length of the stator with respect to the axial direction of the motor axis.

DETAILED DESCRIPTION OF THE INVENTION

Figure 1:
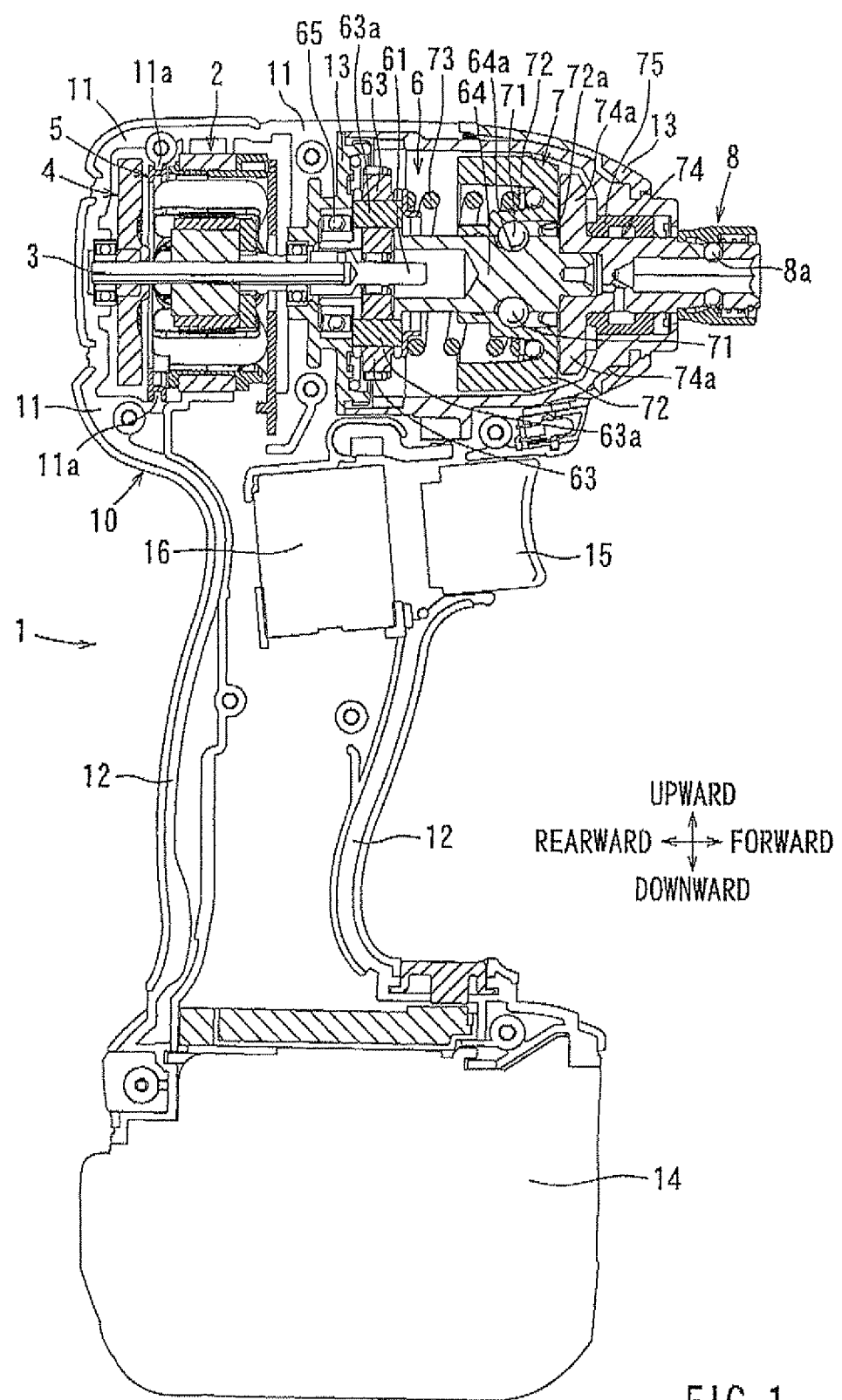
FIG. 1 is a sectional view of an electric tool according to a first embodiment showing a motor housing with a right housing half removed.

Each of the additional features and teachings disclosed above and below may be utilized separately or in conjunction with other features and teachings to provide improved electric tools. Representative examples of the present invention, which examples utilize many of these additional features and teachings both separately and in conjunction with one mother, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, an electric tool may include a motor housing and a motor. The motor housing includes motor housing halves split by a plane extending substantially through a motor axis. The motor may serve as a drive source and may be assembled as a motor assembly received within the motor housing. The motor may include a stator and a rotor. The stator is fixed within the motor housing. The rotor is rotatable about the motor axis relative to the stator. A part of a flow passage of cooling air for cooling the motor may be defined in the motor and may extend in a direction substantially parallel to the motor axis. A baffle may be formed as a separate member from the motor housing and may be located at a position proximal to an end portion of the stator positioned on a downstream side with respect to the flow of the cooling air. The baffle may have a width in an axial direction of the motor axis and may be configured to restrict a flow area of the cooling air flowing through the baffle in the axial direction. The baffle may be mounted to an inner circumferential wall of the motor housing. At least a part of the width of the baffle is positioned within a range of a length of the end portion of the stator with respect to the axial direction.

By positioning at least a part of the width of the baffle to be within the length of the end portion of the stator with respect to the axial direction, the entire length of the electric tool in the axial direction can be reduced by the distance between the baffle and the end portion of the stator and by the distance corresponding to the width of the baffle that are necessary in the case of the known art shown. Hence, it is possible to reduce the axial length of the electric motor without causing degradation in a flow regulating function of the baffle.

The baffle may be positioned entirely within the length of the end portion of the stator. With this arrangement, it is possible to further reduce the axial length of the electric motor.

The stator may includes coils formed by conductive wires having interconnecting portions connecting between the coils, and the end portion of the stator may include retainers configured to retain the interconnecting portions of the conductive wires. The baffle may be engaged with the retainers so as to be prevented from rotation about the motor axis relative to the stator. Because the retainers of the stator can be used for preventing rotation of the baffle, it is not necessary to provide an additional engaging mechanism for preventing rotation of the baffle.

The electric motor may further include an assembling device provided between the baffle and the stator for assembling the baffle with the stator such that the baffle is prevented from moving in the axial direction relative to the stator. Therefore, the baffle can be brought into the motor housing in the state that the baffle is assembled with the stator. Therefore, the motor and the baffle can be easily mounted within the motor housing.

The baffle may have an outer circumferential surface having a recess formed therein, and the motor housing may have an inner circumferential surface having a rib configured to engage the recess, so that the baffle is positioned relative to the motor housing with respect to the axial direction. With this arrangement, between the recess and the rib, it may be possible to form a labyrinth seal in which a clearance is bent into a configuration, such as a U-shape. Due to this labyrinth seal, it may be possible to reliably prevent cooling air from leaking through the clearance between the baffle and the inner circumferential wall of the motor housing.

The electric tool may further include a fan disposed within the motor housing and rotatably driven by the motor, so that air flows along the flow passage of cooling air.

A first embodiment will now be described with reference to FIGS. 1 to 6. An electric tool according to the first embodiment is configured as an impact driver 1 that can drive screws or the like by rotation of a driver bit mounted to the impact tool 1 and by repeatedly applying impact forces to the driver bit in the rotational direction. The impact driver 1 may have a housing 10. The housing 10 may be split into left and right halves by a plane including a motor axis that will be explained later. The left and right halves are joined together to form the housing 10. FIG. 1 shows only the left half of the housing 10. An upper portion of the housing 10 is formed as a motor housing 11. An electric motor 2 serving as a drive source is received within the motor housing 11. A lower portion of the housing 10 is formed as a grip portion 12 extending vertically from the motor housing 11. A hand of an operator can grasp the grip portion 12. In addition to the electric motor 2, a rotary shaft 3 for outputting rotation of the electric motor 2, and a cooling fan 4 for producing a flow of cooling air for cooling the electric motor 2 may be received within the motor housing 11. The rotational axis of the rotary shaft 3 will be called a motor axis. In FIG. 1, the components received within the motor housing 11 are shown in a sectional view taken along the split plane between the left and right halves of the motor housing 11.

Referring to FIG. 1, a rear portion of a mechanism case 13 is supported within the front portion of the motor housing 11. A reduction mechanism 6 for reducing the rotation of the rotational output of the motor 2 and an impact mechanism 7 for applying impacts in the rotational direction are disposed within the mechanism case 13. A rechargeable battery pack 14 for supplying an electric power to the motor 2 and other electric components of the impact driver 1 is removably mounted to the lower end of the grip portion 12. Electric lines (not shown) for electrically connecting the battery pack 13 to the motor 2 is disposed within the grip portion 12. A trigger 15 may be mounted to the upper front portion of the grip portion 12, so that the operator can operate the trigger 15 while he or she grasps the grip portion 12. A switch 16 may be disposed within the grip portion 12 for controlling the supply of electric power to the motor 2 according to the operation of the trigger 15.

For the purpose of explanation, a direction of the motor axis of the motor 2 will be called a forward and rearward direction of the impact driver 1. A tool bit (not shown) nosy be mounted the impact driver 1 so as to be positioned at the front end of the impact driver 1. The grip portion 12 extends substantially in a vertical direction perpendicular to the forward and rearward direction, and the motor housing 11 and the motor 2 may be positioned on the upper side of the grip portion 12. Left and Right directions (lateral direction) may be determined to be left and right directions as viewed from the rear side of the impact driver 1.

The motor housing 12 will be described further with reference to FIGS. 1 to 4. The motor 2, the rotary shaft 3, the cooling fan 4, etc., may be assembled together into a motor assembly before they are received within the motor housing 11. In this specification, the term "assembly" is used to mean that components are grouped together such that they can be handled or carried together. Therefore, it may be possible that some of the components of the assembly are not mechanically joined to the other components but may be supported by the other components during handling or carrying.

The motor housing 11 may have a substantially tubular shape corresponding to the configuration of the motor 2. The motor housing 11 is a part of the housing 10 that is split into the left and right halves. Therefore, the motor housing 11 includes motor housing halves split by a plane extending through the motor axis. The motor assembly may be first mounted within one of the motor housing halves (e.g., the left housing half) from its lateral side (right side). Subsequently, the other of the motor housing halves (e.g., the right housing half) may be joined to the one of the motor housing halves, so that the motor assembly can be received within the motor housing 11.

Figure 4:
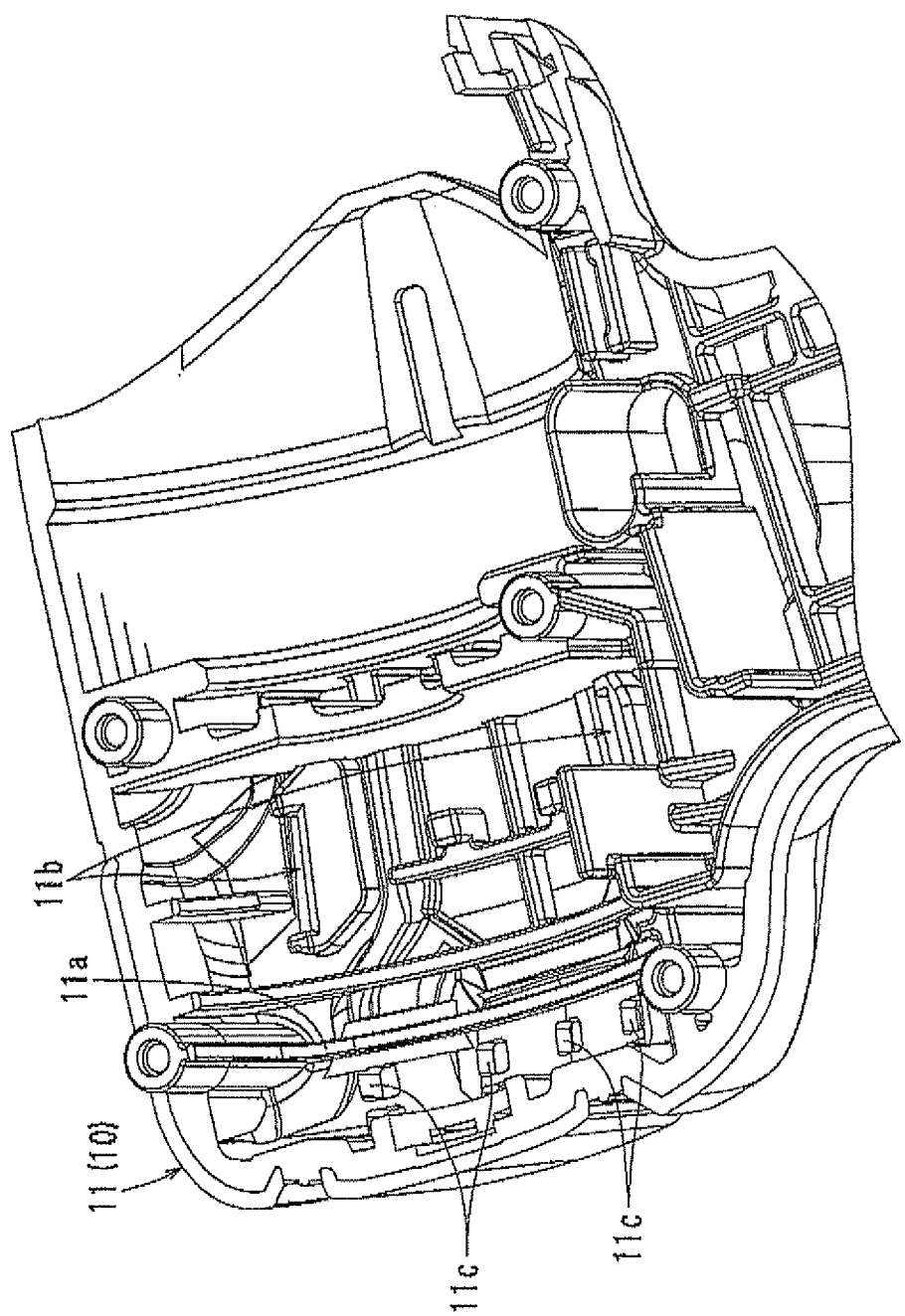
FIG. 4 is a perspective view of the left housing half of the motor housing.

As shown in FIG. 4, a rib 11a may be formed on the inner circumferential wall of each of the motor housing halves, so that the ribs 11a jointly forms a rib extending in the circumferential direction when the motor housing halves are mounted to each other. The ribs 11a may protrude toward inside of the motor housing 11 for supporting and positioning a baffle 5 that may be assembled together with the motor assembly as will be explained later. In addition to the rib 11a, a rib or ribs for supporting the other components other than the baffle 5 and/or for improving the rigidity of the motor housing 11 may be formed on the inner circumferential wall of each of the motor housing halves.

Figure 3:
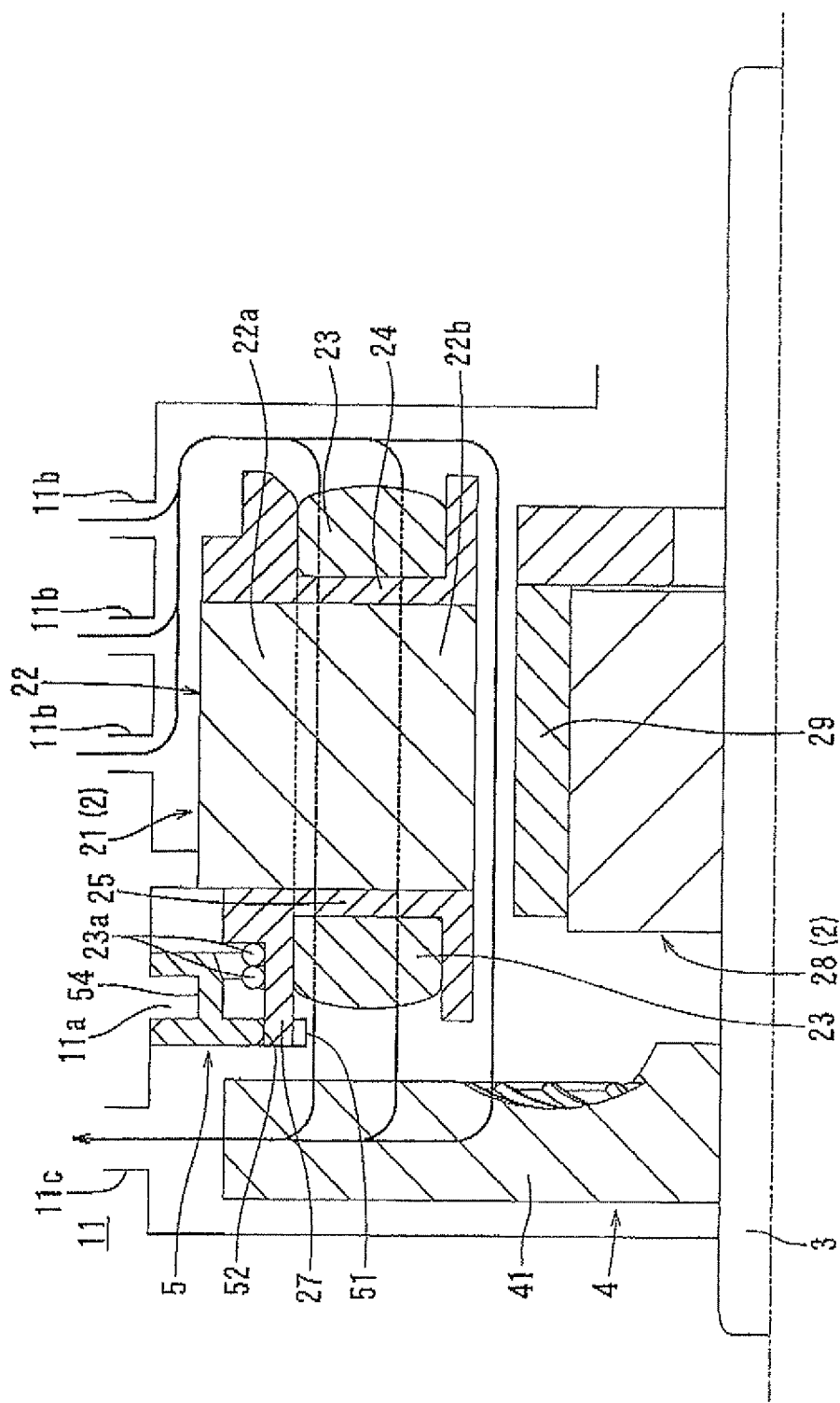
FIG. 3 is a schematic view showing a flow path of cooling air and an arrangement of a baffle within the motor housing.

A flow passage of air for cooling the motor 2 may be formed in the motor housing 12. In this connection, as shown in FIGS. 3 and 4, inlet openings 11b for introducing cooling air into the motor housing 12 and outlet openings 11c for discharging cooling air to the outside may be formed in the inner circumferential wall of each of the motor housing halves. In FIG. 4, the inlet openings 11b are not shown because they are hidden by projections formed on the inner circumferential surface of the motor housing halve. The arrows associated with reference numeral 11b indicate only regions where the inlet openings 11b are provided. The positions of the inlet openings 11b may be determined to correspond to the position of the motor 2. For example, the inlet openings 11b may include three groups of inlet openings 11b located at different positions along the motor axis. Each group of inlet openings 11b may be spaced equally from each other in the circumferential direction. The position of the outlet openings 11c may be determined to correspond to the position of the cooling fan 4. The outlet openings 11c may be spaced equally from each other in the circumferential direction. Therefore, as indicated by arrows in FIG. 3, air entering the motor housing 12 via the inlet openings 11b may flow along flow paths that extends from the inlet openings 11b to the outlet openings 11c via the front side of the motor 2, inside of the motor 2, and the cooling fan 4 on the rear side of the motor 2. In FIG. 4, a solid path line drawn within the region of the motor 2 indicates a flow path part extending though a space formed between a stator 21 and a rotor 28 that will be explained later. Dotted path lines drawn within the region of the motor 2 indicate flow path parts each extending though a gap that may be formed between two adjacent coils 23 of the stator 21. In this way, a flow passage is formed within the motor housing 11c to extend from the inlet openings 11b to the outlet openings 11c across the motor 2.

Figure 2:
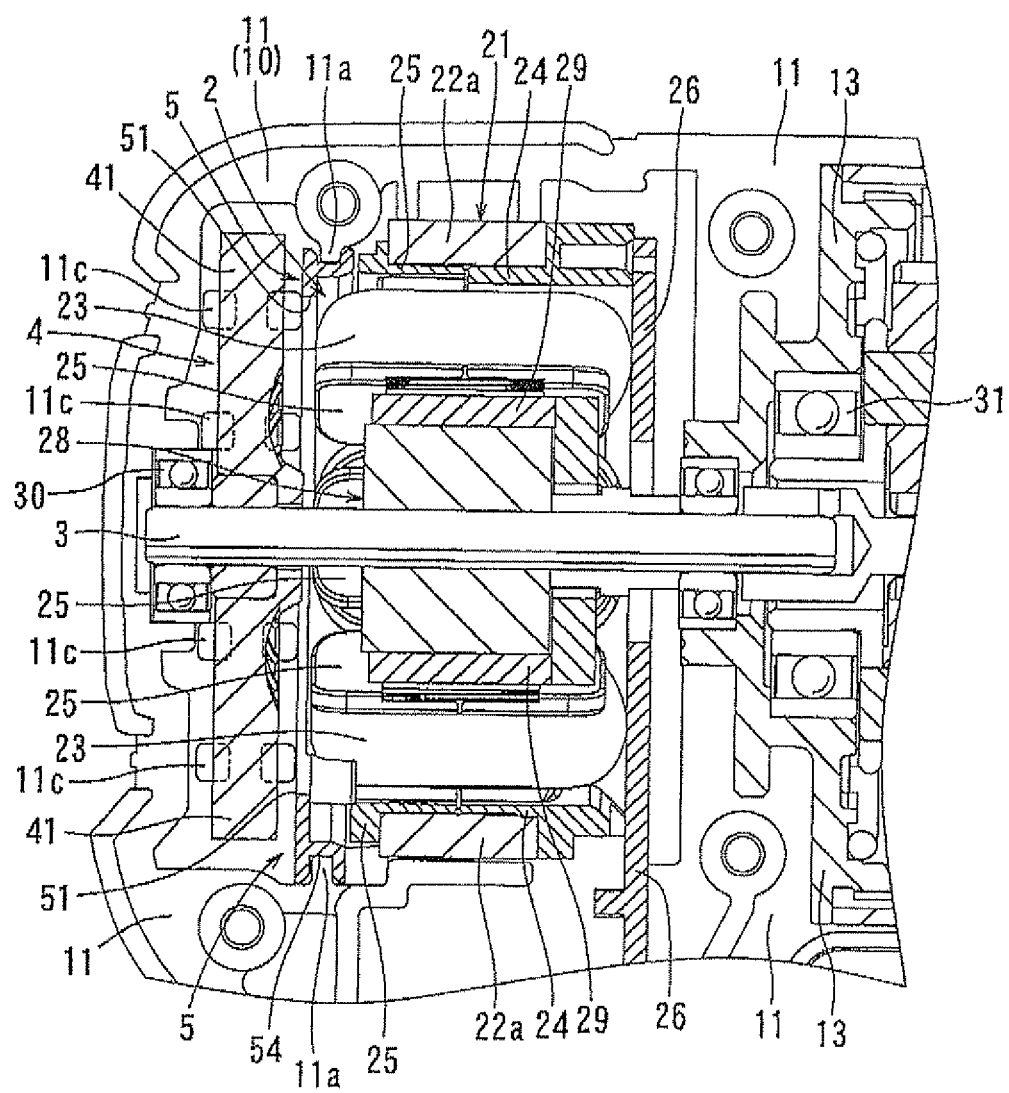
FIG. 2 is an enlarged view of a part around a left housing half of the motor housing of FIG. 1.

The motor 2 will be explained more in detail. The motor 2 is configured as a brush-less motor that does not include a commutator and brushes. Therefore, an electronic circuit (not shown) may be provided for converting the direction of flow of current flowing through the coils 23 that will be explained later. As shown in FIGS. 2 and 3, the motor 2 may include the stator 21 and the rotor 28. The stator 21 has a substantially cylindrical tubular shape and is fixed to the inner circumferential surface of the motor housing 11. The rotor 28 is supported within the motor housing 11 so as to be rotatable relative to and within the stator 21.

Figure 5:
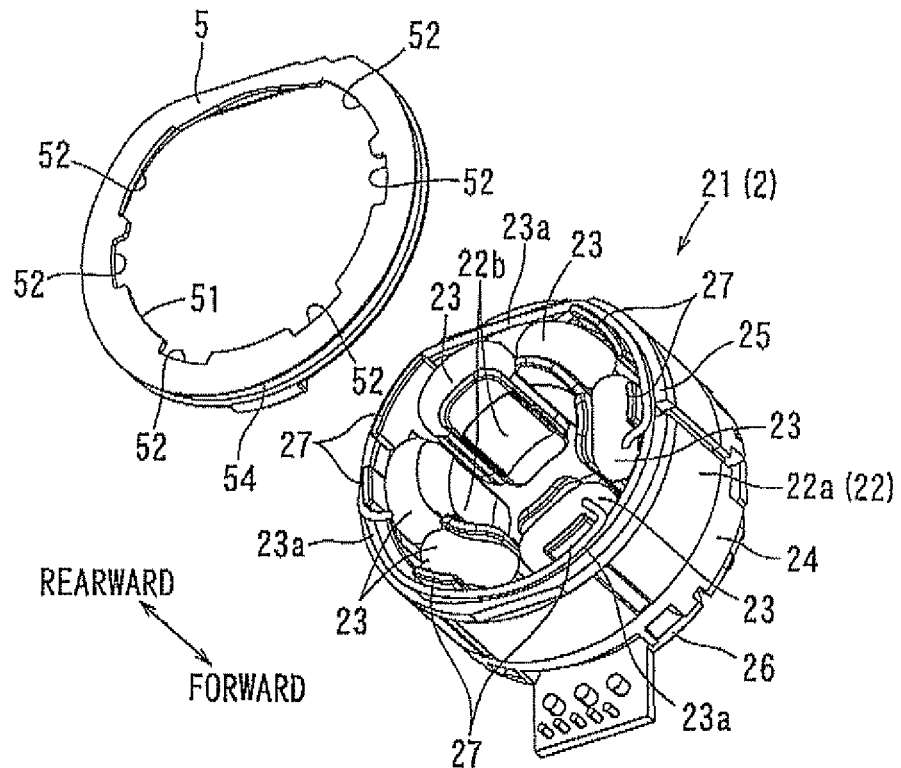
FIG. 5 is a perspective view showing the state before assembling the baffle to a stator of a motor.

The stator 21 may include an iron core 22, the coils 23 formed by conductive wires wound around the core 22, and insulators 24 and 25 for electrically insulating the coils 23 from the core 22. As shown in FIGS. 3 and 5, the core 22 includes cylindrical tubular portion 22a and a plurality of teeth 22b. The plurality of teeth 22b protrude radially inwardly from the tubular portion 22a and are spaced equally from each other in the circumferential direction. In this embodiment, six teeth 22b are provided. The rotor 28 may have a rotor core and permanent magnets 29 disposed on the radially outer side of the rotor core and magnetized such that positive and negative poles are positioned alternately in the circumferential direction. As shown in FIGS. 2, 3 and 5, the insulators 24 and 25 are positioned on the front side and the rear side, respectively, with respect to the core 22 of the stator 21. The insulators 24 and 25 are fitted into the core 22 from the front side and the rear side, respectively, so that the insulators 24 and 25 may cover portions of the teeth 22b, around which the coils 23 are wound, and may also cover portions of the inner circumferential surface and the front and rear end surfaces of the tubular portion 22a. Each of the coils 23 is wound around the portion of each tooth 22b covered by the insulators 24 and 2S, so that six coils 23 are provided in this embodiment.

A circuit board 26 may be attached to the front end of the front insulator 24 by using screws (not shown). The aforementioned electronic circuit (not shown) that converts the direction of flow of current flowing through the coils 23 may be mounted to the circuit board 26. The circuit board 26 may have a substantially annular shape with a central opening, so that cooling air can flow from the front side to the rear side of the circuit board 26 through the central opening.

In this embodiment, the coils 23 include three pairs of coils 23 that are different in phases from each other. Each pair of coils 23 positioned opposite to each other with respect to the rotational axis are configured to generate magnetic fluxes that are the same phase. Each pair of coils 23 are formed by a single conductive wire, and therefore, three conductive wires are used to form six coils 23. Opposite ends of the conductive wire for each pair of coils 23 are electrically connected to the electronic circuit on the circuit board 26 at the front end of the stator 21.

As shown in FIG. 5, retainers 27 extend rearward from the stator 21. Each of the retainers 27 serves to support an interconnecting portion 23a of the conductive wire forming the pair of coils 23 such that the interconnecting portion 23a is positioned radially outward of the rotor 28 and the coils 23. In this embodiment, the retainers 27 are formed integrally with the rear insulator 25 and extend axially rearward therefrom. The interconnecting portion 23a of the conducting wire is engaged by the outer side surfaces of the corresponding retainers 27 so as to be retained by the same. The retainers 27 have shapes of arcs of a circle about the rotational axis (motor axis). Because of a wounding process necessary for the coils 23, the axially extending length of the retainers 27 may preferably be determined such that it can ensure a minimum distance for retaining the interconnecting portions 23a of the coils 23 even after assembled as the motor 2 and can still provide a predetermined allowance at the rear end portions of the retainers 27.

The rotary shaft 3 will be hereinafter described with reference to FIG. 2. The rotary shaft 3 transmits rotation generated by the motor 2 to the cooling fan 4 and the reduction mechanism 6. The rotary shaft 3 extends through the rotor 28 and fixed thereto, so that the rotary shaft 3 rotates about the same axis as the rotor 28. The rear end of the rotary shaft 3 may be rotatably supported by a bearing 30 mounted to the rear end of the motor housing 11. The front portion of the rotary shaft 3 may be rotatably supported by a bearing 31 mounted to the rear end of the mechanism case 13. The front end of the rotary shaft 3 extends into inside of the mechanism case 13 through the bearing 31.

The cooling fan 4 will now be described with reference to FIGS. 2 and 3. The cooling fan 4 is positioned on the rear side of the motor 2 and is mounted to the rear portion of the rotary shaft 3, so that the cooling fan 4 rotates with the rotary shaft 3 and the rotor 28. The fan 4 may include a plurality of fan blades 41 that extend in the radial direction with respect to the rotary shaft 3 and are configured such that air may be introduced in the axial direction toward the fan 4 and may then be forced to flow radially outward as the fan 4 rotates. As schematically shown in FIG. 3, the fan 4 serves to forcibly discharge air from the outlet holes 11c formed in the inner circumferential wall of the motor housing 11 (at positions radially outer side of the fan 4), so that a negative pressure is produced in a space adjacent to the fan 4, causing air to be introduced into the motor housing 11 via the inlet holes 11b. In this way, a flow of air from the Inlet holes 11b to the outlet holes 11c may be produced by the rotation of the fan 4. Here, the fan blades 41 of the fan 4 are spaced from the baffle 5 such that the baffle 5 does not interfere with the rotation of the blades 41 and that no substantial reduction in an air blowing force of the fan 4 is caused.

Figure 6:
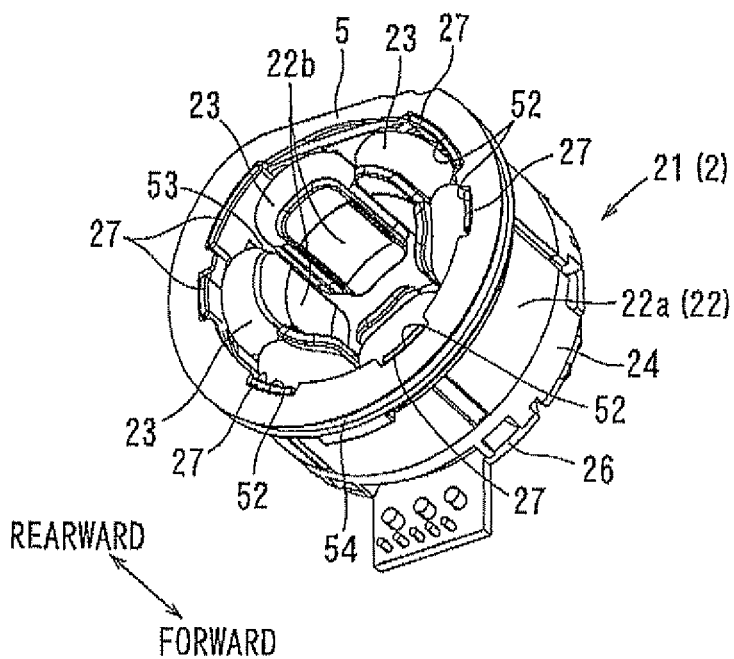
FIG. 6 is a perspective view showing the state after assembling the baffle to the stator.

The baffle 5 will now be described with reference to FIGS. 3, 5 and 6. The baffle 5 serves to regulate the flow of air for cooling the motor 2. More specifically, the baffle 5 is mounted within the motor housing 11 at a position on the rear side of the stator 21 of the motor 2 in order to restrict the flow of cooling air. In other words, the baffle 5 serves to narrow the flow area of the cooling air before the air is forced to be discharged by the fan 4. The baffle 5 may be a separate member from the motor housing 11 and the stator 21 and may be made of synthetic resin. The baffle 5 may have a substantially annular shape (see FIGS. 5 and 6) with a central opening, so that the cooling air may flow from its front side to the rear side through the opening. As shown in FIG. 3, an inner circumferential edge 51 defining the central opening of the baffle 5 is positioned on a radially inner side of the retainers 27 that retain the interconnecting portions 23a of the coils 23. Therefore, the flow passage of the cooling air flowing across the motor 2 may be narrowed at the baffle 5 such that the outer circumference of the flow area restricted by the baffle 5 (i.e., the inner circumferential edge 51 of the baffle 5) is positioned to be axially opposed to the radially outer portions of the coils 23, which are positioned on the radially inner side of the interconnecting portions 23a. Hence, the coils 23 that may generate heat during the operation of the motor 2 can be effectively cooled.

As best shown in FIG. 3, the thickness of the baffle 5 with respect to the axial direction is determined to be smaller than the axially extending length of the retainers 27, so that the baffle 5 is positioned within the axially extending length of the retainers 27 when the baffle 5 is assembled with the retainers 27. As shown in FIG. 5, a plurality of arc-shaped recesses 52 are formed at the inner circumferential edge 51 of the baffle 5 for engagement with the retainers 27. More specifically, the recesses 52 are recessed into the baffle 5 in a direction radially outward from the inner circumferential edge 51. The recesses 52 are positioned to correspond to the positions of the retainers 27 and are configured to correspond to the arc shapes of the retainers 27. As described previously, the extending length of the retainers 27 may be determined to be able to still provide a predetermined allowance at the rear end portions of the retainers 27 when in the state where the interconnecting portions 23a are engaged by the retainers 27 by the winding operation of the conductive wires. Therefore, the retainers 27 may be engaged with the recesses 52 such that the rear ends of the retainers 27 are positioned substantially flush with the rear surface of the baffle 5 or positioned rearward of the rear surface of the baffle 5. With this engagement of the baffle 5 with the retainers 27, the baffle 5 can be prevented from rotation relative to the stator 21.

An annular recess 54 may be formed in the outer circumferential surface of the baffle 5 for engagement with the ribs 11a formed on the inner circumferential wall of the motor housing 11. Due to engagement of the annular recess 54 with the ribs 11a, the baffle 5 may be fixed in position in the axial direction relative to the motor housing 11 and also relative to the stator 21. Therefore, the baffle 5 can be fixed in position in the axial direction relative to the stator 21 as it is mounted within the motor housing 11.

The engagement between the annular recess 54 of the baffle 5 and the ribs 11a of the motor housing 11 may form a labyrinth seal in which a clearance between them has a shape bent two times in the radial direction (i.e., like a crank shape). Due to this labyrinth seal, it may be possible to reliably prevent cooling air from leaking through the clearance between the baffle 5 and the inner circumferential wall of the motor housing 11.

The reduction mechanism 6 will now be described with reference to FIG. 1. The reduction mechanism 6 may be configured as a planetary gear mechanism and may include a pinion gear 62, an internal gear (not shown), two planetary gears 63 and a spindle 64. The pinion gear 62 may be mounted to the front end of the rotary shaft 3 that protrudes into inside of the mechanism case 13, so that the pinion gear 62 rotates with the rotary abaft 3 about the same axis. The internal gear may have the same axis as the pinion gear 62 and may have internal gear teeth opposed to the pinion gear 62 in the radial direction. The planetary gears 63 may be interposed between the pinion gear 62 and the internal gear and each may engage both the pinion gear 62 and the internal gear, so that the pinion gears 63 can perform an orbital movement as the pinion gear 62 rotates. Support shafts 63a for rotatably supporting the planetary gears 63 may be fixedly coupled to the front end of the spindle 64, so that the orbital movement of the planetary gears 63 may be transmitted to the spindle 64. The rear end of the spindle 64 may be rotatably supported by a bearing 65 mounted to the mechanism case 13, so that the spindle 64 can rotate about the same axis as the rotary shaft 3 of the motor 2.

The impact mechanism 7 may generate impacts based on the rotation of the spindle 64 and will be described with reference to FIG. 1. The impact mechanism 7 generally includes a hammer 72 and an anvil 74. The hammer 72 may be mounted to the front portion of the spindle 64 so as to be positioned on the radially outer side thereof. The anvil 74 may be positioned on the front side of the hammer 72. Two steel balls 71 may be interposed between the outer circumferential surface of the front portion of the spindle 64 and the inner circumferential surface of the hammer 72, so that the rotational torque of the spindle 64 may be transmitted to the hammer 72 via the steel balls 71. Two substantially V-shaped grooves 64a may be formed in the outer circumferential surface of the spindle 64 for engagement with the steel balls 71, respectively. More specifically, each of the V-shaped grooves 64a may be oriented such that the open side and the close side of the V-shape are positioned on the rear side and the front side, respectively. On the other hand, two guide grooves 72a may be formed in the inner circumferential surface of the hammer 72 and extend in the axial direction for engagement with the steel balls 71, respectively, so that each of the steel balls 71 engages both the V-shaped groove 64a and the guide groove 72a so as to be movable (roll) along them. As the load applied to the hammer 72 against its rotation increases, the spindle 64 rotates relative to the hammer 72, so that each of the steel balls 71 moves along the corresponding V-shaped groove 64a toward its open side of the V-shape. Then, the hammer 72 moves rearward relative to the spindle 64, so that the hammer 72 moves rearward within the mechanism case 13.

As the hammer 72 moves forward within the mechanism case 13, the hammer 72 may engage the anvil 74 in the rotational direction. On the other hand, as the hammer 72 moves rearward, the hammer 72 may be disengaged from the anvil 74. The hammer 72 may have a pair of impact applying projections (not shown) protruding forwardly therefrom. On the other hand, the anvil 74 may have a pair of arms 74a extending radially therefrom for engagement with the impact applying projections of the hammer 72. A coil spring 73 may be disposed on the rear side of the hammer 72 for normally forwardly biasing the hammer 72. When the hammer 7 is positioned at a front-side position by the biasing force of the coil spring 73, the impact applying projections can engage the arms 74a in the rotational direction. Therefore, the hammer 72 can transmit the rotational torque to the anvil 74 as long as the impact applying projections engage the arms 74a. As noted above, the hammer 72 moves rearward as the load applied to the hammer 72 increases. This rearward movement may be caused against the biasing force of the coil spring 73 by the reaction force applied by the anvil 74. In this way, the hammer 72 reciprocates in the forward and rearward direction to engage with and disengage from the anvil 74, so that impacts are repeatedly applied to the anvil 74 in the rotational direction.

The anvil 74 has a middle portion that is rotatably supported by a bearing 75 mounted within the mechanism case 13. The front end of the anvil 74 protrudes forwardly outward from the mechanism case 13. A chuck mechanism 8 may be mounted to the front end of the anvil 74. The chuck mechanism 8 may include balls 8a that can removably hold a tool bit (not shown) that can engage a fastener, such as a screw. Therefore, the fastener can rotate with the chuck mechanism 8 and eventually with the anvil 74.

Figure 11:
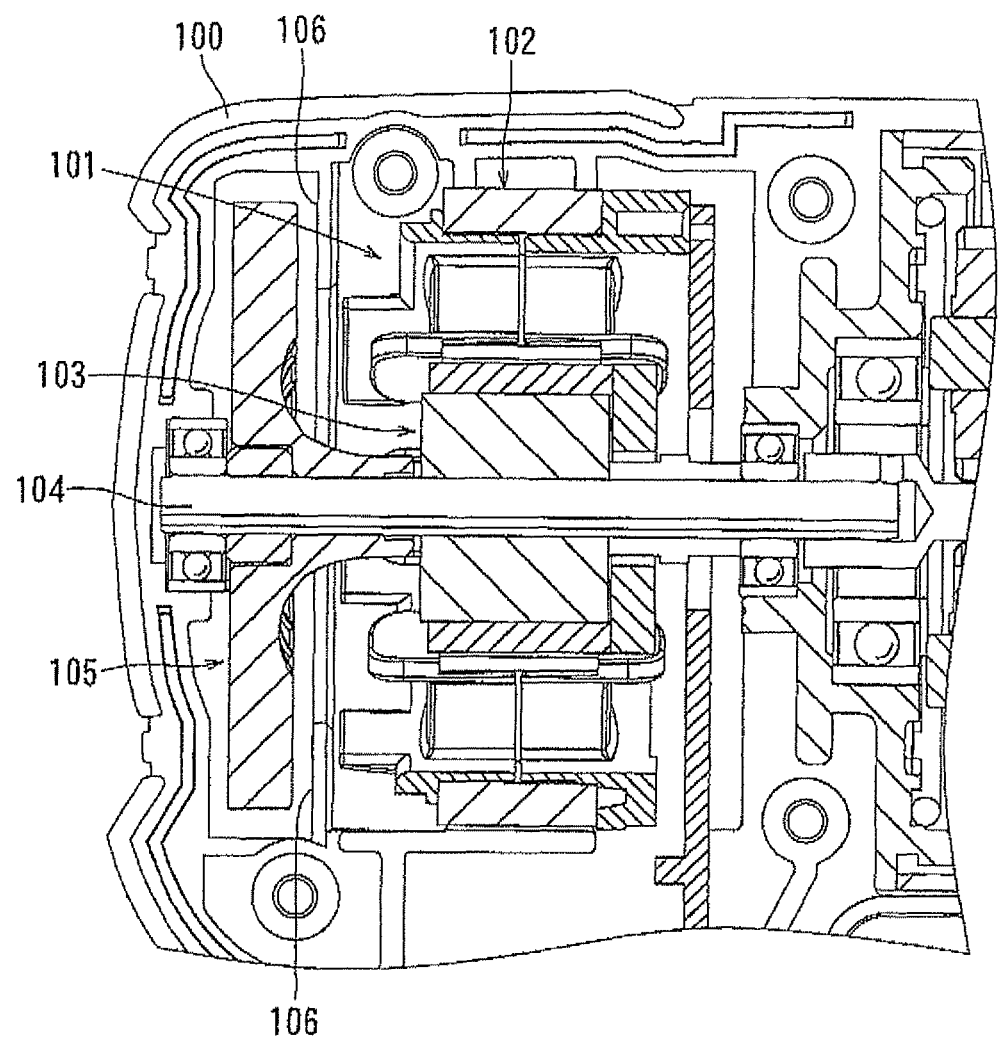
FIG. 11 is an enlarged sectional view of a part of a known electric tool showing a motor housing with a right housing half removed.
Figure 12:
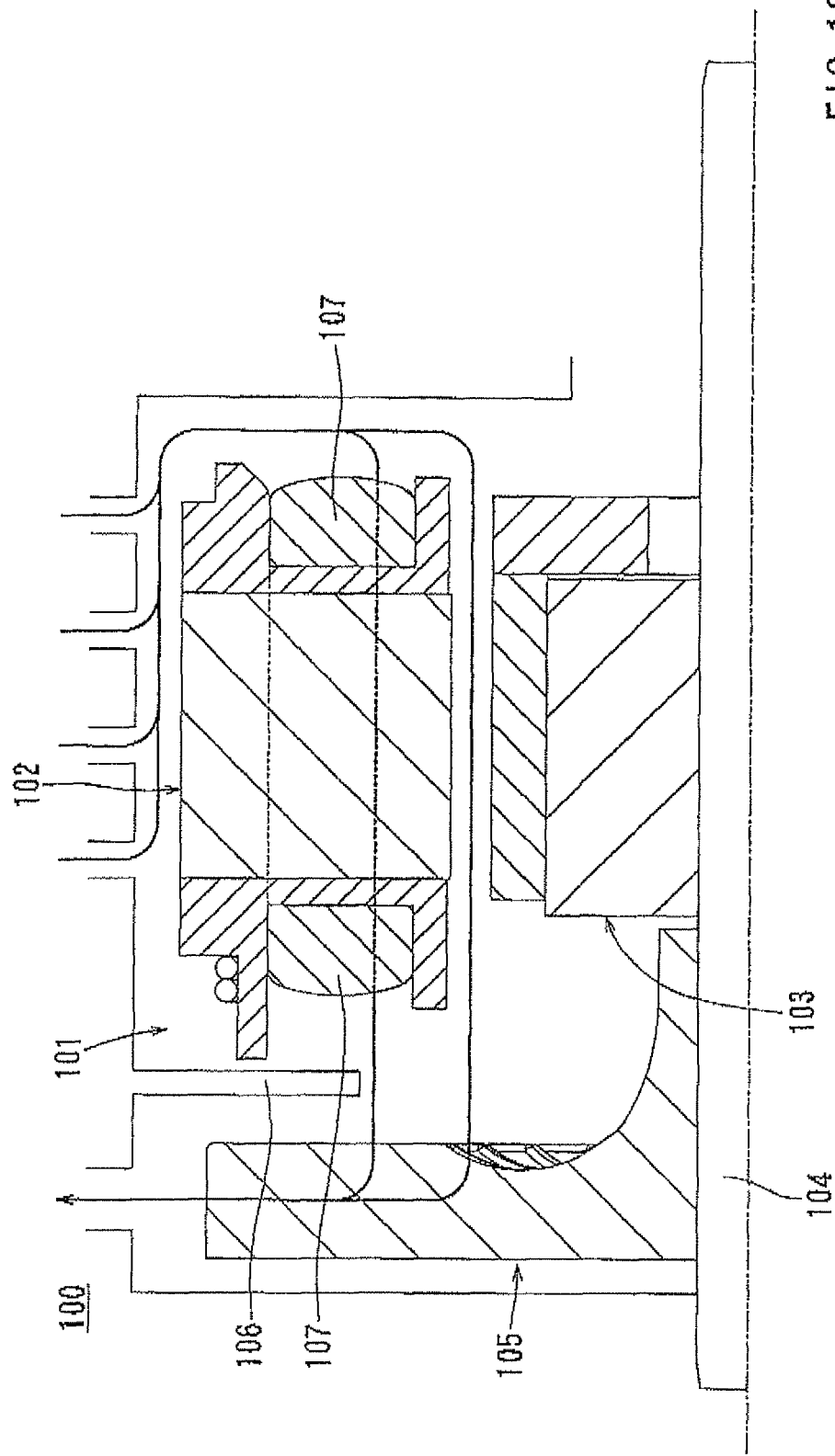
FIG. 12 is a schematic view showing a flow path of cooling air and an arrangement of a baffle within the motor housing of the known electric tool.

As described above, according to the present embodiment, the baffle 5 that is a separate member from the motor housing 11 is disposed at a position corresponding to the retainers 27 that serve as a rear end portion of the stator 21 positioned on the downstream side with respect to the flow of cooling air. At least a part of a width of the baffle 5 is positioned within the axial length of the rear end portion of the stator 21 (i.e., within the length of the retainers 27). Therefore, the distance between the baffle 5 and the fan 4 can be reduced by the distance between the baffle and the rear end of the stator and by the distance corresponding to the width of the baffle that are necessary in the case of the known art shown in FIGS. 11 and 12. Hence, it is possible to reduce the axial length of the motor housing 11 and eventually the entire axial length of the impact driver 1.

In addition, the arc-shaped recesses 52 of the baffle 5 engage the retainers 27 of the stator 21, which retain the interconnecting portions 23a each connecting between the pair of coils 23, so that the baffle 5 is prevented from rotation relative to the stator 21 about the motor axis. Therefore, the baffle 5 can be axed in position in the rotational direction about the motor axis (i.e., in the circumferential direction) by using the retainers 27 that are parts of the stator 21 without need of an additional member. Because the arc-shaped recesses 52 are formed to extend radially outward from the inner circumferential edge 51 of the baffle 5, it is possible to easily form the baffle 5.

Further, the annular recess 54 formed in the outer circumferential surface of the baffle 5 engages the ribs 11a formed on the inner circumferential wall of the motor housing 11. Therefore between the annular recess 54 of the baffle 5 and the ribs 11a of the motor housing 11, a labyrinth seal, in which a clearance between them has a shape bent like a crank, may be formed. Hence, it may be possible to reliably prevent cooling air from leaking through the clearance between the baffle 5 and the inner circumferential wall of the motor housing 11.

A second embodiment will now be described with reference to FIGS. 7 to 10. The second embodiment is a modification of the first embodiment, in particular a modification of the baffle 5. Therefore, in FIGS. 7 to 10, like members are given the same reference numerals as the first embodiment and the description of these members will not be repeated.

Referring to FIGS. 7 to 10, according to the second embodiment, the baffle 5 of the first embodiment is replaced with a baffle 105 that has arc-shaped slots 152 formed therein for engagement with the retainers 27. The slots 152 are positioned to correspond to the positions of the retainers 27 and have shapes corresponding to the shapes of the retainer 27. Thus, the recesses 52 of the baffle 5 of the first embodiment are replaced with the slots 152. Similar to the recesses 52, the retainers 27 may be engaged with the slots 152 such that the rear ends of the retainers 27 are positioned substantial flush with the rear surface of the baffle 105 or positioned rearward of the rear surface of the baffle 105.

Three projections 153 (only one projection 153 is shown in the drawings) are formed on the front surface of the baffle 105 and may be used for fixing the baffle 105 in position relative to the stator 21 with respect to the axial direction. The projections 153 may be arranged at positions spaced equally from each other in the circumferential direction, so that each of the projections 153 can be inserted into the stator 21 at a position between two coils 23 that are positioned adjacent to each other in the circumferential direction. Therefore, the projections 153 may be inserted with the baffle 105 positioned at any of six different rotational positions. However, the slots 152 of the baffle 105 are configured such that the slots 152 can be engaged with the retainers 27 only when the baffle 105 is positioned at a predetermined rotational position that is one of the six different positions. In other words, the baffle 105 cannot be mounted to the retainer 27 unless the baffle 105 is positioned at the predetermined rotational position.

Figure 7:
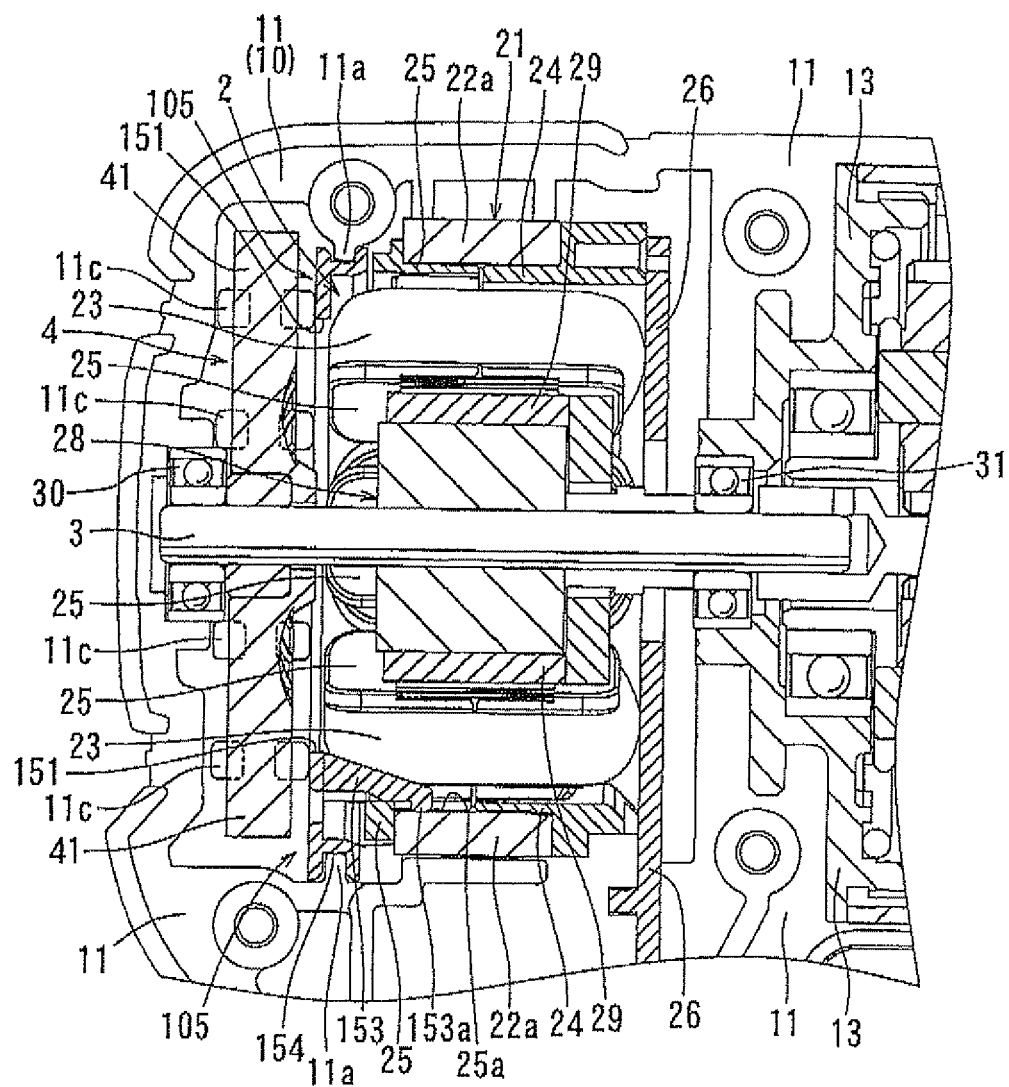
FIG. 7 is a view similar to FIG. 2 but showing a part around a left housing half of a motor housing of an electric tool according to a second embodiment.
Figure 8:
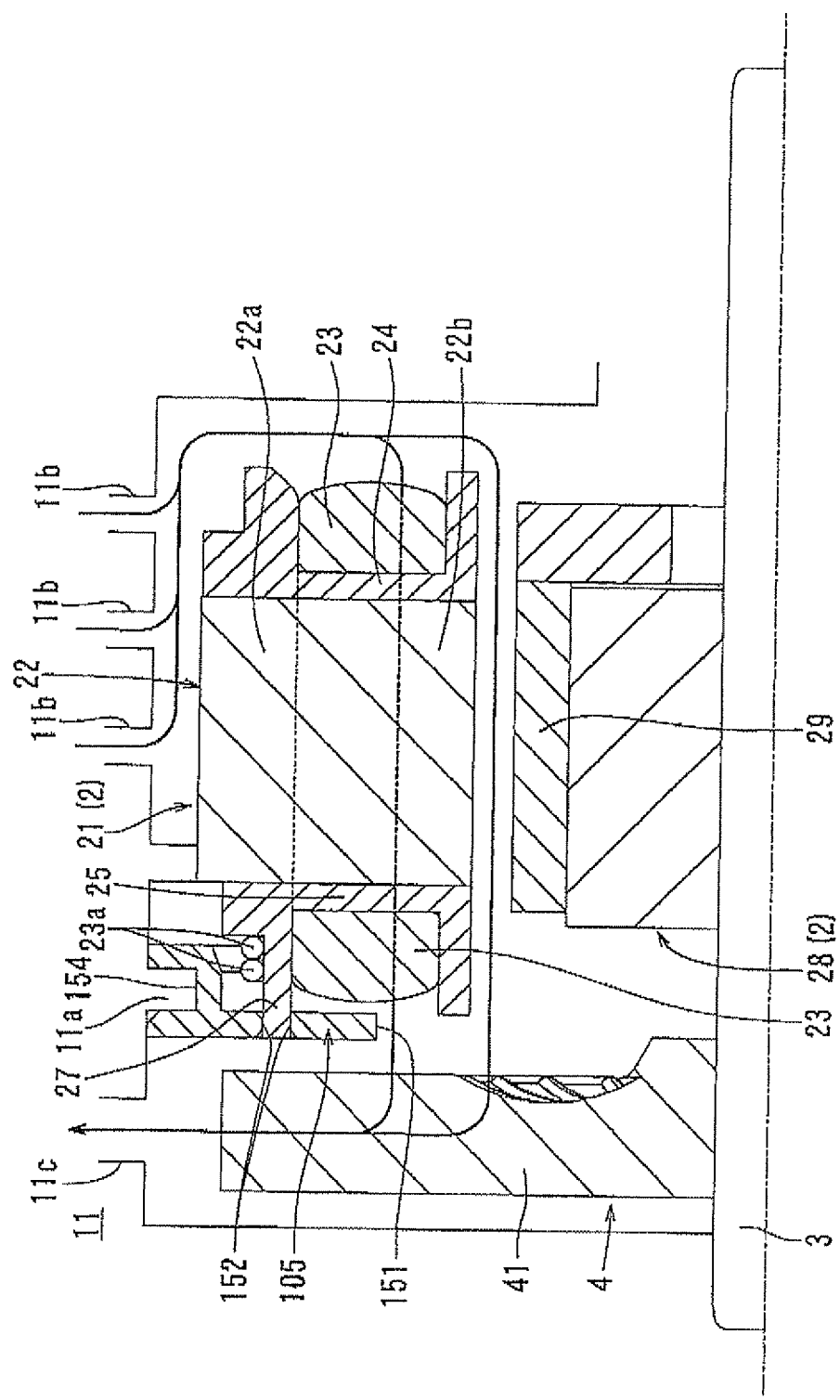
FIG. 8 is a schematic view showing a flow path of cooling air and an arrangement of a baffle within the motor housing according to the second embodiment.
Figure 9:
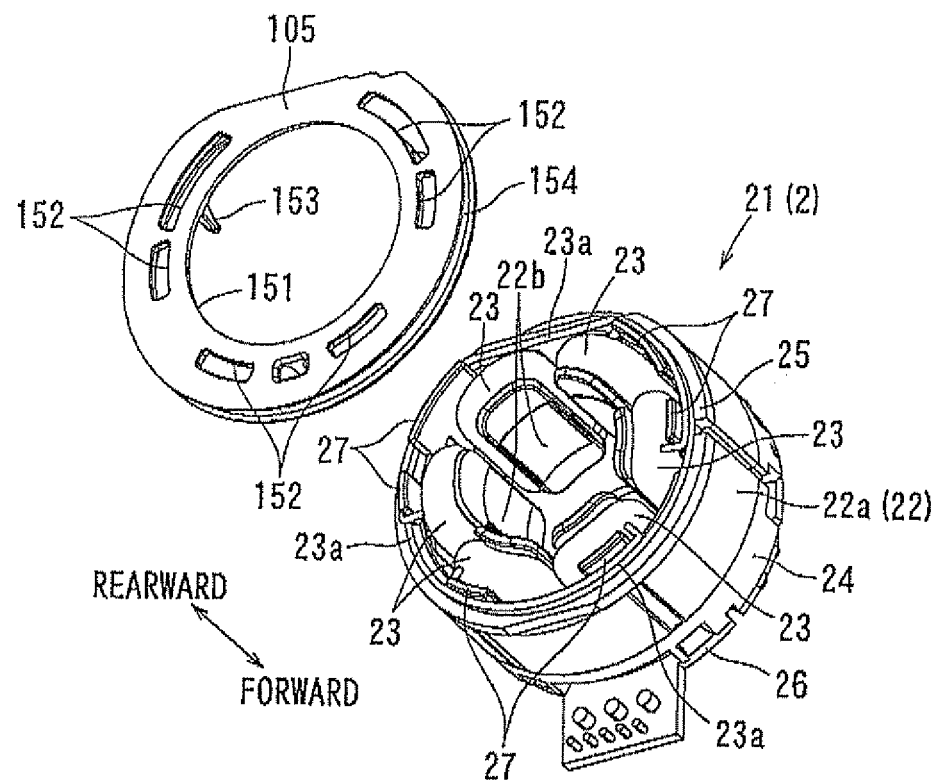
FIG. 9 is a perspective view showing the state before assembling the baffle to a stator of a motor according to the second embodiment.
Figure 10:
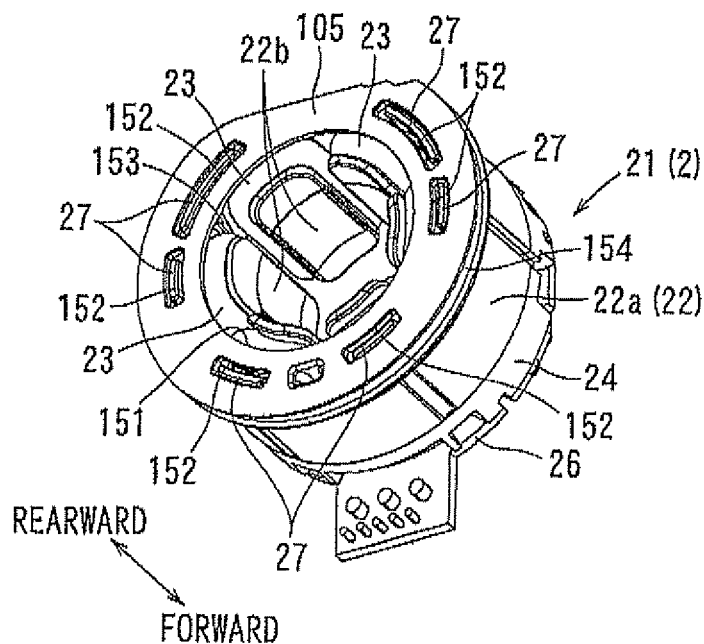
FIG. 10 is a perspective view showing the state after assembling the baffle to the stator according to the second embodiment.

As shown in FIG. 7, a claw 153a is formed on the front end of each projection 153 and is bent radially outward therefrom. On the other band, slits 25a may be formed in the cylindrical inner circumferential surface of the stator 21, so that the projections 153 can engage the slits 25a as they are inserted into the slits 25a in a direction radially outward. More specifically, the slits 25a may be formed in a cylindrical tubular portion of the insulator 25 and may extend in the axial direction by a predetermined length. The cylindrical tubular portion of the insulator 25 may be positioned to cover the inner circumferential surface of the tubular portion 22a of the core 22 as the insulator 25 is fitted into the tubular portion 22a. As the claws 153a of the projections 153 engage the slits 25a, the baffle 105 may be prevented from being removed from the stator 21 in the axial direction. An assembling mechanism constituted by the claws 153a and the slits 25a may be used as a provisional assembling mechanism or a provisional fixing mechanism that enables the baffle 105 to be assembled with the motor assembly prior to mounting the motor assembly within the motor housing 11. The baffle 105 may have an annular recess 154 formed in the outer circumferential surface of the baffle 105. The annular recess 154 may be similar to the annular recess 54 of the first embodiment.

As described above, according to the second embodiment, the arc-shaped slots 152 of the baffle 105 can engage the retainers 27 of the stator 21, which retain the interconnecting portions 23a each connecting between the pair of coils 23, so that the baffle 105 can be prevented from rotation relative to the stator 21 about the axis. Therefore, the baffle 105 can be fixed in position in the rotational direction about the motor axis (i.e., in the circumferential direction) by using the retainers 27 that are parts of the stator 21. Thus, similar to the first embodiment, the baffle 105 can be fixed in position in the circumferential direction relative to the stator 21.

Further, the projections 153 having the claws 153a are formed on the front surface of the baffle 105, and the slits 25a are formed in the cylindrical inner circumferential surface of the stator 21 to enable engagement of the claws 153a as the claws 153a are inserted into the slits 25a in the radially outward direction. Therefore, the baffle 105 can be provisionally assembled with the stator 21 of the motor 2 prior to mounting the motor assembly within the motor housing 11. In addition, as the claws 153a of the projections 153 engage the slits 25a, the baffle 105 may be prevented from being removed from the stator 21 in the axial direction. In this way, the baffle 105 can be assembled with the motor assembly prior to mounting the motor assembly within the motor housing 11. As a result, the motor 2 and the baffle 105 can be easily mounted within the motor housing 11.

The above first and second embodiments may be modified in various ways. For example, in these embodiments, the baffle 5(105) is positioned such that the baffle 5(105) is positioned entirely within the axial length of the rear end (i.e., the retainers 27) of the stator 21. However, it may be possible that at least a part of the width of the baffle 5(105) is positioned within the axial length of the rear end of the stator 21. Even with this arrangement, the distance between the baffle 5(105) and the fan 4 can be reduced by the distance between the baffle and the rear end of the stator and by the distance corresponding to the overlapped width of the baffle in comparison with the known art shown in FIGS. 11 and 12.

In addition, although the retainers 27 are used for engagement with the baffle 5(105), an engaging member that is different from the retainers 27 may be mounted to or attached to the stator 21 for supporting the baffle 5(105) and preventing rotation of the baffle relative to the stator 21.

Although three projections 153 are formed on the front surface of the baffle 105 to provide an assembling mechanism for assembling the baffle 105 with the stator 21 in the second embodiment, the projections 153 may be omitted. In such a case, it may be preferable to configure the retainers 27 and the slots 152 of the baffle 105 such that the retainer 27 can engage the slots 152 with engaging forces that are enough to prevent accidental removal of the baffle 105. With this arrangement, the assembling mechanism can prevent rotation of the baffle 105 in the circumferential direction and also can prevent removal of the baffle 105 in the axial direction.

Further, although the above embodiments are described in connection with the impact driver 1 that is used for driving fasteners, the above teachings can be also applied to any other electric tools as long as they have motors and baffles for regulating flow of cooling air for cooling the motors.

What is claimed is:

1. An electric tool comprising:
   a motor housing including motor housing halves joined to each other at a joint plane extending substantially through a motor axis,
   a motor serving as a drive source and assembled as a motor assembly received within the motor housing;
   wherein the motor includes a stator and a rotor, the stator being configured to be fixed within the motor housing, the rotor being configured to be rotatable about the motor axis relative to the stator;
   wherein a part of a flow passage of cooling air for cooling the motor is defined in the motor and extends in a direction substantially parallel to the motor axis; and
   a baffle configured as a separate member from the motor housing and located at a position proximal to an end portion of the stator positioned on a downstream side with respect to the flow of the cooling air;
   wherein the baffle has a width in an axial direction of the motor axis and is configured to restrict a flow area of the cooling air flowing through the baffle in the axial direction;
   wherein the baffle is mounted to an inner circumferential wall of the motor housing;
   wherein at least a part of the width of the baffle is positioned within a range of a length with respect to the axial direction of the end portion of the stator and
   wherein the baffle has an outer circumferential surface having a recess formed therein, and the motor housing has an inner circumferential surface having a rib configured to engage the recess, so that the baffle is positioned relative to the motor housing with respect to the axial direction.

2. The electric tool according to claim 1, wherein the width of the baffle is positioned entirely within the length of the stator with respect to the axial direction.

3. The electric tool according to claim 1, wherein the stator includes coils formed by conductive wires having interconnecting portions connecting between the coils, and the end portion of the stator includes retainers configured to retain the interconnecting portions of the conductive wires.

4. The electric tool according to claim 3, wherein the baffle is engaged with the retainers so as to be prevented from rotation about the motor axis relative to the stator.

5. The electric tool according to claim 1 further comprising an assembling device provided between the baffle and the stator and configured to assemble the baffle with the stator such that the baffle is prevented from moving in the axial direction relative to the stator.

6. The electric tool according to claim 1, further comprising a fan disposed within the motor housing and rotatably driven by the motor, so that the fan produces the flow of cooling air.

7. An electric tool comprising:
   a motor housing;
   a motor disposed within the motor housing and having a stator fixed in position relative to the motor housing and a rotor rotatable about a motor axis;
   wherein cooling air can flow within the motor housing across the motor in a direction substantially parallel to the motor axis;
   a baffle disposed within the motor housing and configured to regulate the flow of cooling air across the motor, the baffle being a separate member from the motor housing;
   wherein at least a part of the baffle is positioned within a range of a length of the stator with respect to an axial direction of the motor axis; and a circumferentially engaging device configured to engage the baffle with the stator, so that the baffle is positioned relative to the stator with respect to a circumferential direction about the motor axis.

8. The electric tool according to claim 7, wherein the baffle is positioned on a downstream side of the stator with respect to the flow of the cooling air and configured to restrict a flow area of the cooling air that leaves the motor.

9. The electric tool according to claim 7, further comprising an axially engaging device configured to engage the baffle with the stator, so that the baffle is positioned relative to the stator with respect to the axial direction.

10. The electric tool according to claim 7, further comprising an axially engaging device configured to engage the baffle with the motor housing, so that the baffle is positioned relative to the housing with respect to the axial direction.

11. The electric tool according to claim 7, further comprising a fan disposed within the motor housing and rotatably driven by the motor, so that the fan produces the flow of cooling air.

12. The electric tool according to claim 7, wherein the circumferentially engaging device includes:
a plurality of protrusions extending in the axial direction of the motor axis; and
a plurality of recesses or slots formed in the baffle and engageable with the plurality of protrusions in the axial direction of the motor axis.

13. The electric tool according to claim 12, wherein:
the plurality of protrusions are spaced from each other in the circumferential direction; and
the plurality of recesses or notches are arranged to correspond to the positions of the plurality of protrusions.

14. The electric tool according to claim 13, wherein the plurality of protrusions of the stator and the plurality of recesses or notches of the baffle are arranged such that the plurality of recesses or notches are allowed to engage the plurality of protrusions while the baffle is positioned at a predetermined position relative to the stator with respect to the circumferential direction.

15. The electric tool according to claim 12, wherein the plurality of protrusions of the stator and the plurality of recesses or notches of the baffle are sized such that the baffle is inhibited from being removed from the stator in the axial direction when the plurality of protrusions are in engagement with the plurality of recesses or notches.

16. The electric tool according to claim 12, wherein:
the stator includes a core, coils wound around the core, and an insulator for electrically insulating the coils from the core;
the insulator has a first end and a second end opposite to the first end in the axial direction of the motor axis; and
the plurality of protrusions are formed on the first end of the insulator.

17. The electric tool according to claim 16, further comprising a circuit board attached to the second end of the insulator.

18. The electric tool according to claim 7, wherein:
the baffle is disposed on a first side of the stator with respect to the axial direction of the motor axis, and
the electric tool further includes a circuit board disposed on a second side of the stator opposite to the first side.

19. An electric tool comprising:
a motor housing;
a motor disposed within the motor housing and having a stator fixed in position relative to the motor housing and a rotor rotatable about a motor axis;
wherein cooling air can flow within the motor housing across the motor in a direction substantially parallel to the motor axis; and
a baffle disposed within the motor housing and configured to regulate the flow of cooling air across the motor, the baffle being a separate member from the motor housing;
wherein at least a part of the baffle is positioned within a range of a length of the stator with respect to an axial direction of the motor axis;
a first engaging device configured to engage the baffle with the stator, so that the baffle is positioned relative to the stator with respect to the axial direction; and
a second engaging device configured to engage the baffle with the motor housing, so that the baffle is positioned relative to the housing with respect to the axial direction.

* * * * *